United States Patent
Koch

(10) Patent No.: US 7,257,204 B2
(45) Date of Patent: Aug. 14, 2007

(54) METHODS, SYSTEMS, AND PRODUCTS FOR PROVIDING COMMUNICATIONS SERVICES

(75) Inventor: Robert A. Koch, Norcross, GA (US)

(73) Assignee: AT&T Intellectual Property, Inc., Wilmington, DE (US)

( * ) Notice: Subject to any disclaimer, the term of this patent is extended or adjusted under 35 U.S.C. 154(b) by 108 days.

(21) Appl. No.: 10/801,222

(22) Filed: Mar. 16, 2004

(65) Prior Publication Data

US 2004/0174964 A1 Sep. 9, 2004

Related U.S. Application Data

(63) Continuation-in-part of application No. 09/753,234, filed on Dec. 29, 2000, now abandoned.

(51) Int. Cl.
*H04M 1/64* (2006.01)
(52) U.S. Cl. ............... 379/88.21; 379/88.14; 379/88.17; 379/142.01; 707/104.1; 709/203
(58) Field of Classification Search ............... 718/203; 379/88.14, 88.1, 88.22, 142.01, 88.17, 88.21; 709/203; 707/104.1
See application file for complete search history.

(56) References Cited

U.S. PATENT DOCUMENTS

| | | | |
|---|---|---|---|
| 5,278,894 A | 1/1994 | Shaw | |
| 5,692,038 A | 11/1997 | Kraus | |
| 5,857,013 A | 1/1999 | Yue | |
| 5,963,626 A | 10/1999 | Nabkel | |
| 6,087,355 A | 7/2000 | Boon-Chen | |
| 6,182,045 B1 | 1/2001 | Kredo et al. | |
| 6,310,944 B1* | 10/2001 | Brisebois et al. | 379/142.01 |
| 6,438,217 B1* | 8/2002 | Huna | 379/88.14 |
| 6,608,888 B2* | 8/2003 | Bedingfield et al. | 379/88.22 |
| 6,668,576 B1 | 12/2003 | Ericson | |
| 6,738,784 B1* | 5/2004 | Howes | 707/104.1 |
| 6,757,898 B1* | 6/2004 | Ilsen et al. | 709/203 |
| 6,768,789 B1 | 7/2004 | Wilk | |

* cited by examiner

*Primary Examiner*—Gerald Gauthier
(74) *Attorney, Agent, or Firm*—Scott P. Zimmerman, PLLC; Geoff Suicliffe; Todd Mitchem

(57) ABSTRACT

Methods, systems, and products are disclosed for providing communications services. One method allows a subscriber to create a data message. The subscriber may associate the data message to an originating party and to a recipient. When a communication from the originating party is received, the data message is communicated to the recipient via an Internet Protocol communications network.

21 Claims, 7 Drawing Sheets

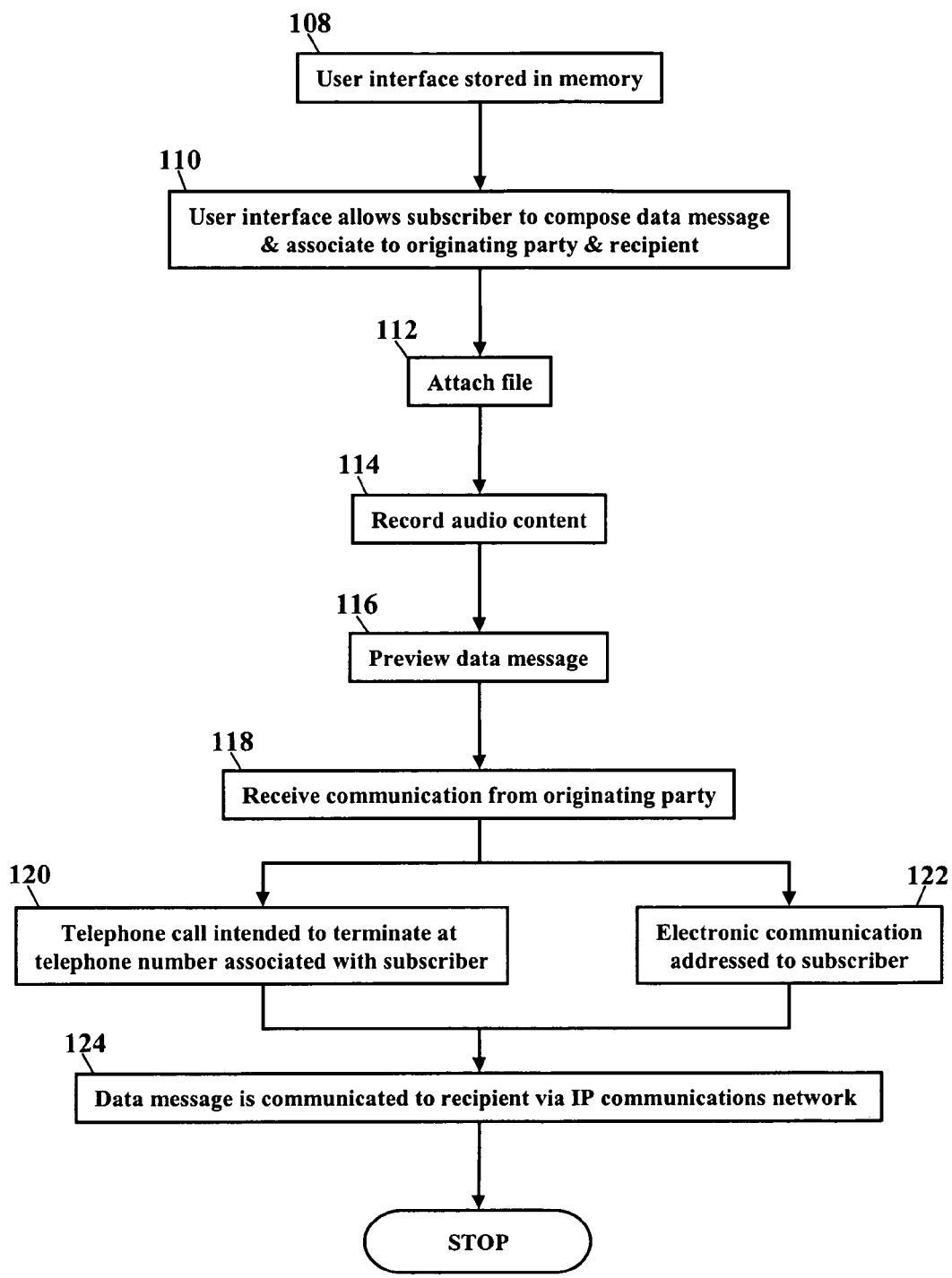

METHODS, SYSTEMS, AND PRODUCTS FOR PROVIDING COMMUNICATIONS SERVICES

CROSS-REFERENCE TO RELATED APPLICATIONS

This application is a continuation-in-part of U.S. application Ser. No. 09/753,234, entitled "Web-Based Messaging System with Caller-Specific Messages," filed Dec. 29, 2000 now abandoned, and of which the "Summary of the Invention" section and the "Detailed Description of the Present Invention" section are incorporated herein by reference.

This application also relates to the commonly owned and concurrently filed U.S. application Ser. No. 10/802.085, entitled "Methods, Systems, and Products for Providing communications Services" of which the "Brief Summary of the Invention" and the "Detailed Description of the Invention" sections are incorporated herein by reference.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND OF THE INVENTION

1. Field of the Invention

This invention generally relates to electrical computers, telecommunications, telephonic communications, electrical communications and, more particularly, to messaging systems.

2. Description of the Related Art

The term "voice mail" is often utilized to refer to systems wherein parties may leave spoken messages for one another that are stored and retrieved at a later time. Voice mail is also utilized to refer to spoken messages attached to electronic mail communications.

Telephone answering systems are an example of a voice mail system. In a conventional telephone answering system a user records a greeting that is replayed to incoming callers if the user does not answer the telephone. Generally, the answering system allows an incoming caller to record a spoken message that may be retrieved and listened to at a later time.

Although widely utilized, telephone answering systems have not advanced to a significant degree. The United States patent literature discloses several approaches to improving telephone answering systems and their components. U.S. Pat. No. 5,278,894 to Shaw, the disclosure of which is hereby incorporated herein by reference, discloses a method and apparatus for providing customized greeting messages from a switch based voice messaging service. U.S. Pat. No. 6,067,355, to Lim et al., the disclosure of which is also hereby incorporated herein by reference, discloses a caller-ID device and/or integrated caller-ID and answering machine device which is configurable 1) to play pre-recorded announcement for the user when the caller ID information received over the PSTN (Public Switched Telephone Network) corresponds to stored information indicating an important caller; 2) to play a pre-recorded "block-the-blocker" outgoing message for the caller when a blocked-caller-ID code is received; and/or 3) to play a pre-recorded "reject call" outgoing message for the caller when the caller-ID information corresponds to stored information indicating an undesirable caller.

There are several methods and products that allow the user of a telephone to identify the source of an incoming telephone call. U.S. Pat. No. 5,692,038, to Kraus et al., the disclosure of which is hereby incorporated herein by reference, discloses a method for identifying the source of a communication, including the steps of: receiving the communication on a calling line; identifying the calling line number associated with the calling line; accessing a database to provide an identity for the source by finding a database entry corresponding to the calling line number; announcing this identity to the source; and requesting confirmation. U.S. Pat. No. 6,009,158, to Romero, the disclosure of which is also hereby incorporated herein by reference, discloses a caller ID call-back device that allows a user to automatically place telephone calls to selected directory numbers using several dialing plans.

It would be advantageous to have a telephone answering system that allows a user to provide a personalized caller specific greeting. For example, a home telephone user may wish to inform a contractor that the user will be home at a certain hour in order to let the contractor in. The home telephone user, however, would not want to leave a general answering machine message informing all callers that the user would be away from home and returning at a particular time. A personalized caller specific greeting system would allow the home telephone user's answering system to respond to a call from the contractor with a message such as "Thank you for your call, Ms. Jones will be home at 4:00 PM to let you into the house," while responding to other calls with a general message such as "We cannot answer the phone right now, please leave a message for us after the tone." Similarly, a business telephone user may wish to leave personalized caller specific greetings for specific clients etc. As will be understood by those of ordinary skill in the art, there are a large number of potential uses for such a personalized caller specific greeting system.

In addition to telephones, in recent years, the number of communication devices and their use, has increased dramatically. Examples of communication devices include telephones, analog and digital cellular phones, pages, wireless email devices, personal digital assistants and the like. Many such devices are able to directly access the world wide web and/or corporate intranet sites.

Prior telephone answering systems often required a user to physically interact with an answering machine in order to configure the machine. Alternatively, several types of answering machines were generally configurable via telephone. It would be advantageous, however, to have a telephone answering system that was configurable via an electronic communications pathway such as the world wide web. It would be further advantageous if such a telephone answering system provided for personalized caller specific greetings.

BRIEF SUMMARY OF THE INVENTION

The present invention provides a messaging system that overcomes the disadvantages with prior systems and provides new advantages to its users. This messaging system allows a user to provide personalized, pre-created messages in response to incoming callers and electronic communications. In embodiments of the present invention, the messaging system may be configured remotely, for example via the internet/world wide web.

According to the present invention, a messaging system comprises a pre-created data message and a processing system. The processing system comprises a caller identification system and a database of specific messages linked to specific caller identification data. The processing system is linked to a public switched telephone network, for example, through an intranet link including proper security measures, and to the world wide web.

A user of the system may access the processing system through the world wide web through a personal computer, personal digital assistant or wireless phone with internet capabilities. The processing system maintains an individual subscriber profile for the user that the user can configure with specific messages, e.g. voice mail greetings and data messages. The user may then control and specify which message is provided to a particular caller. The subscriber profile comprises information, including the subscriber's telephone number or numbers and caller identification data for the subscriber of the type generally found in public switched telephone networks. In embodiments of the present invention, a user may also access the processing system via a wire line or wireless telephone to configure their subscriber profile via Voice XML.

For use, a user accesses his or her individual subscriber profile via a personal computer or other means. The user then provides a list of one or more telephone numbers that, if a call is received from, the messaging system will provide a customized, pre-created message to the party placing the call to the subscriber. The telephone numbers are converted to their respective caller identification ("caller id") data. If a call is received by the subscriber, caller id data for call is obtained and the processing system is notified. The processing system and queries the subscriber profile to determine whether the caller id for the call matches a caller id specified by the subscriber. If so, the processing system provides the pre-created message entered by the subscriber into the processing system. The message is returned through the public switched telephone network to the caller. In embodiments of the present invention the processing system may direct a service control point (SCP) to direct a Service Switching Point (SSP) to route the incoming call to a specific network location, referred to herein as a voice/web gateway to receive the customized message.

This invention describes an entirely new messaging system. This invention allows a user (such as a subscriber of this messaging service) to compose pre-created data messages for particular individuals and/or groups. That is, the subscriber can compose individualized data messages for friends, family members, co-workers, and groups of people. When the subscriber receives a telephone call, or an electronic communication, from an originating party (e.g., the friend or family member), this invention automatically replies with the particular pre-created data message intended for that originating party. The pre-created data message is communicated to the originating party, and the originating party may then read the automatically-replied data message.

This invention provides pre-created data messages. One of the embodiments allows a subscriber to compose a data message. The subscriber may then associate the pre-created data message to an originating party and to a recipient. When a communication from the originating party is received, the pre-created data message is communicated to the recipient via an Internet Protocol communications network. The term "communication," as used herein, can mean both a telephone call and/or a data message. The term "communication," then, can be a familiar Plain Old Telephone System call and can be an Internet Protocol call over a Voice-Over Internet Protocol communications network. The term "communication" may also include electronic communications, such as data messages using an Internet Protocol (e.g., email). The term "pre-created data message" means any previously composed electronic communication message using an Internet Protocol. The pre-created data message may include data message, such as emails, instant messages, short messages, and packetized Voice-Over Internet Protocol communications.

Another of the embodiments describes another method for providing communications services. Here a user interface is stored in memory. The user interface allows a subscriber to compose a data message and to associate that data message with an originating party and with a recipient. When a communication from the originating party is received, the data message is then automatically communicated to the recipient.

Other embodiments of this invention describe a system for providing communications services. A Communications Module is stored in a memory device, and a processor communicates with the memory device. The Communications Module allows a subscriber to compose a data message and to associate that data message with an originating party and with a recipient. When a communication from the originating party is received, the Communications Module initiates communication of the data message to the recipient.

Still other embodiments of this invention describe a computer program product. A computer-readable medium stores a Communications Module. The Communications Module allows a subscriber to compose a data message and to associate that data message with an originating party and with a recipient. When a communication from the originating party is received, the Communications Module initiates communication of the data message to the recipient.

An advantage of the present invention is that the subscriber's profile information may be remotely accessed and configured. That is, a subscriber may utilize the world wide web, via a personal computer, personal digital assistant or wireless phone, to compose the pre-created messages. Thus, a subscriber may configure his or her information and profile from locations remote from the phone receiving the incoming calls. Another advantage of the present invention is that a subscriber may configure their profile utilizing Voice XML input. This aspect of the present invention allows the subscriber to update their profile remotely utilizing a voice link. A further advantage of the present invention is that a subscriber may configure their profile to deliver specific pre-created messages, including customized data messages, to specific incoming callers and to incoming electronic communications.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE SEVERAL VIEWS OF THE DRAWINGS

These and other features, aspects, and advantages of the embodiments of the present invention are better understood when the following Detailed Description of the Invention is read with reference to the accompanying drawings, wherein:

FIG. 7 is a flowchart illustrating a method of providing communications services, according to the embodiments of this invention.

DETAILED DESCRIPTION OF THE INVENTION

Figure 1:
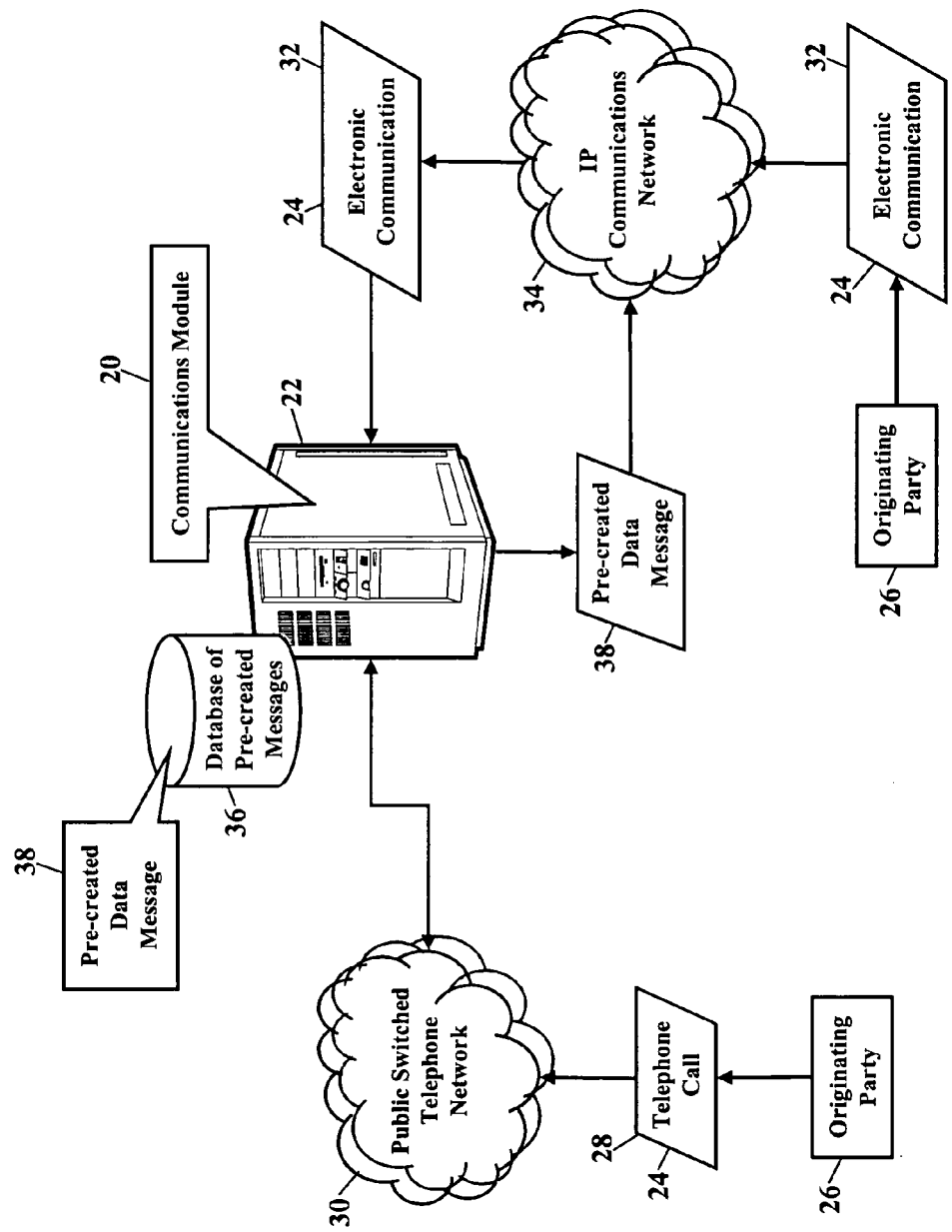
FIG. 1 is a simplified schematic illustrating the embodiments of this invention.

This invention now will be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

This invention describes an entirely new messaging system. This invention allows a user (such as a subscriber of this messaging service) to compose pre-created data messages for particular individuals and/or groups. That is, the subscriber can compose individualized data messages for friends, family members, co-workers, and groups of people. When the subscriber receives a telephone call, or an electronic communication, from an originating party (e.g., the friend or family member), this invention automatically replies with the particular pre-created data message intended for that originating party. The pre-created data message is communicated to the originating party, and the originating party may then read the automatically-replied data message.

The messaging system of this invention is easy to establish and to use. The subscriber accesses a user interface. The user interface allows the subscriber to compose each pre-created data message. The user interface then asks the subscriber to associate each pre-created data message to any number of intended recipients. Each recipient can be identified by any identifying information. Each recipient, however, is most likely identified by their calling telephone number, their email address, their listing information, or any other Internet Protocol information (e.g., their email address). The user interface also asks the subscriber to select what event triggers the automatically-replied data message. The subscriber, for example, might want a calling party to automatically receive a pre-created data message. If the subscriber receives an email from a friend, the subscriber might want that friend to receive a pre-created, automatically-replied email. The subscriber may also choose a pre-created data message when an Internet Protocol telephone call is received. The subscriber may even choose to have others notified when a telephone call is received. Each pre-created data message, in fact, may be communicated to any destination of the subscriber's choosing, such as individuals and/or groups (e.g., a "buddy list").

This invention allows the subscriber to create personalized, pre-created messages for particular people. This invention differs from traditional "auto-reply" email software features in that the subscriber can compose unique, personalized messages for any number of recipients. The subscriber, for example, might compose one or more pre-created messages for family members and, yet, different pre-created messages for coworkers. If a coworker should attempt to reach the subscriber (via a telephone call or an electronic communication) on a vacation day, the pre-created data message might read "I will be on vacation and will return Monday." Should a family member, however, attempt to reach the subscriber, the pre-created data message might read "We have gone skiing in the mountains, but we will return in time for Dave's birthday party." The subscriber may even choose to compose pre-created data messages for particular individuals. "Steve, we plan to arrive at your house Saturday evening around 7 PM." "Jane, the kids are sick, so we must cancel our lunch." "Mr. Jones, I will return to the office Monday, however, the monthly report is attached to this message." "Team, because it is raining, I have rescheduled baseball practice for Monday evening." The subscriber simply composes whatever message is desired, and the subscriber then associates that message to the individual recipient(s).

FIG. 1 is a simplified schematic illustrating the embodiments of this invention. The embodiments of this invention include a Communications Module 20. The Communications Module 20 comprises methods, systems, computer programs, and/or computer program products that provide pre-created data messages in response to incoming communications. The Communications Module 20 operates within any computer system, such as a communications server 22. The Communications Module 20 receives, or detects receipt of, a communication 24 from an originating party 26. As FIG. 1 illustrates, the term "communication" can mean a familiar Plain Old Telephone System (POTS) telephone call 28. The Communications Module 20, as will be later explained, would then operate within the communications server 22 interfacing with a Public Switched Telephone Network (PSTN) 30. The term "communication" may also include an electronic communication 32, such as an email message, an instant message, a short messaging service, voice-over internet protocol (VoIP) calls, and/or other data messages, communicated via an Internet Protocol communications network 34. When the communication 24 is received, a database 36 of pre-created data messages is accessed. The database 36 stores a pre-created data message 38 having a common association between a receiving party and the originating party. The pre-created data message 38 is then retrieved and communicated via the Internet Protocol communications network 34.

Figure 2:
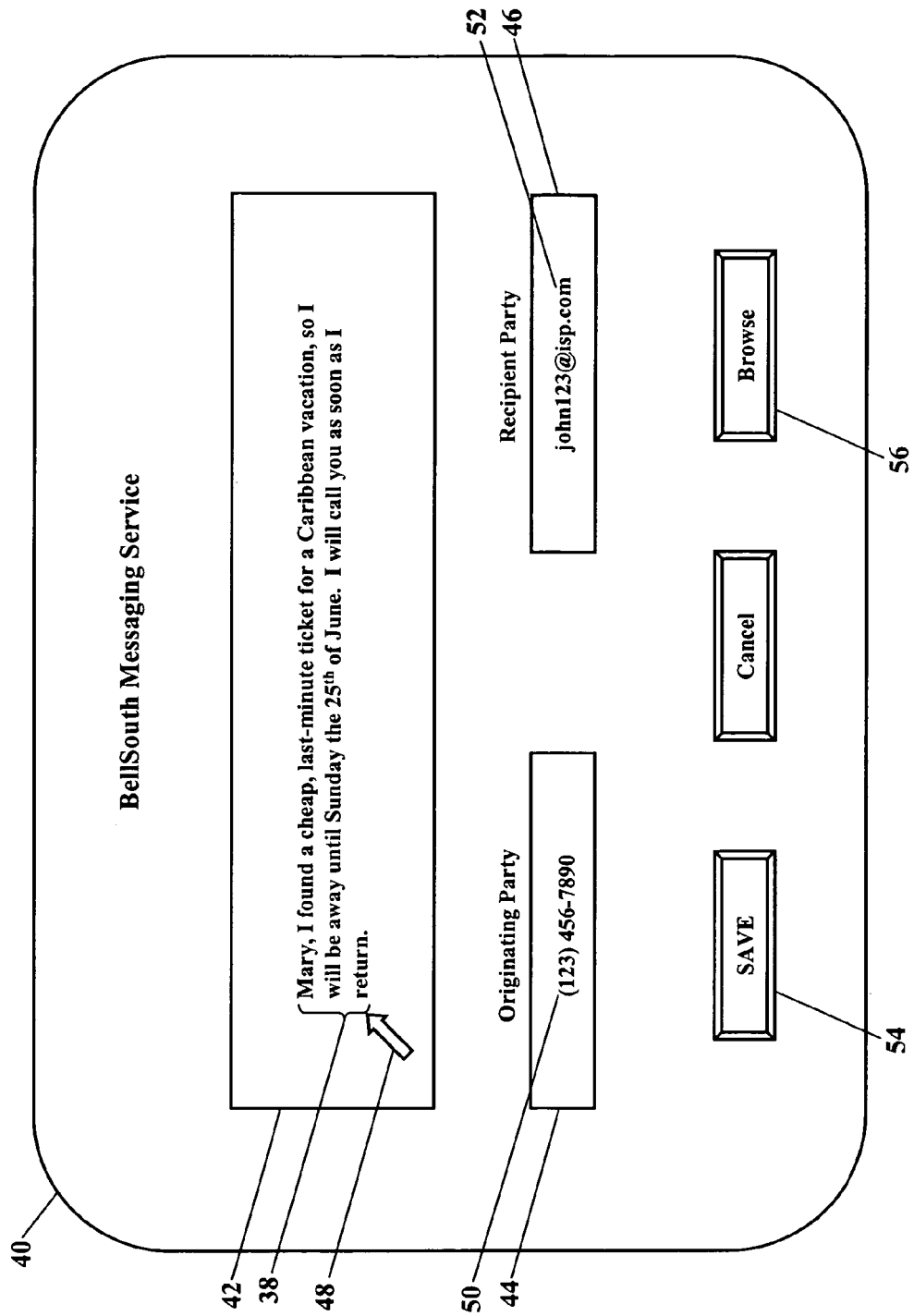
FIGS. 2-4 are schematics illustrating a user interface, according to the embodiments of this invention.

FIG. 2 is a schematic illustrating a user interface 40, according to the embodiments of this invention. The Communications Module (shown as reference numeral 20 in FIG. 1) of the present invention, operating within a system memory device of the communications server (shown as reference numeral 22 in FIG. 1), allows the subscriber to compose pre-created data messages. FIG. 2 shows a representation of the user interface 40 that the Communications Module might present to the subscriber. The Communications Module would present the user interface on a display device and allow the subscriber to enter data and to make choices. The user interface 40 includes a message data field 42, an originating party data field 44, and a recipient data field 46. The subscriber places a curser 48 in the message data field 42 and types the desired data message 38. The subscriber then places the curser 48 in the originating party data field 44 and types an identifier 50 for the party originating the communication (the POTS telephone call 28 and/or the electronic communication 32 shown in FIG. 1). The subscriber then places the curser 48 in the recipient data field 46 and types an identifier 52 for the recipient of the data message 38. The identifiers 50 and 52 may be telephone numbers, email addresses, and/or other Internet Protocol address identifiers. Once the data message 38 is created, and the originating party data field 44 and the recipient data field 46 are completed, the user interface 40 prompts the subscriber to "save" the data message 38. The user interface 40 includes a graphical "Save" prompt 54 that stores the pre-created data message 38 to a local memory device, such as a hard disk peripheral device. The graphical "Save" prompt 54 could also save the pre-created data message 38 to a remote server/memory destination communicating with the Internet Protocol communications network (shown as reference numeral 34 in FIG. 1). The user interface 40 may also include a graphical "Browse" prompt 56. The graphical "Browse" prompt 56 allows the subscriber to choose the memory destination when saving the pre-created data message 38. Then, when the communication from the originating party is received, the pre-created data message 38 is communicated to the recipient.

Figure 3:
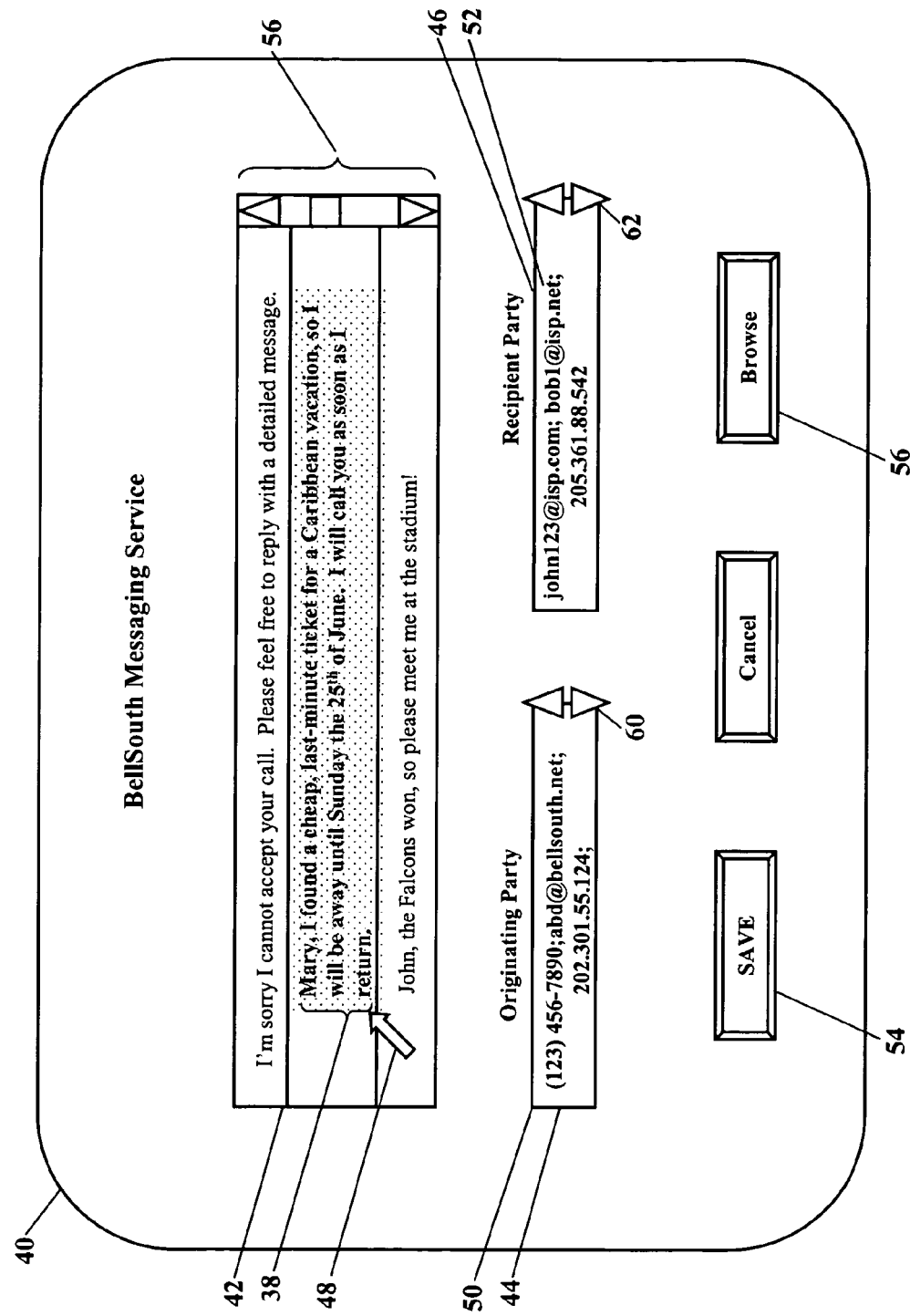

FIG. 3 is a schematic further illustrating the user interface 40, according to the embodiments of this invention. Here the user interface 40 allows the subscriber to select multiple originating parties, recipients, and data messages. The message data field 42, for example, may present multiple data messages 38. These multiple data messages 38 could be recently communicated messages, archival messages, or even a library of "canned" messages. A pair of scroll icons 58 allows the subscriber to scroll up and down the listing of multiple data messages 38. The subscriber would then "highlight" or otherwise select the desired pre-created data message 38. The originating party data field 44 and the recipient data field 46 could similarly present multiple entries. The subscriber could enter multiple originating party identifiers 50 and multiple recipient identifiers 52. When a communication is then received from either originating party identifier 50, the same pre-created data message 38 is communicated to each recipient identifier 52. The originating party data field 44 and the recipient data field 46 may each include scrolling icons 60 and 62. The scrolling icons 60 and 62 allow the subscriber to scroll up and down a listing of identifiers. The identifiers 50 and 52 could be recent originating parties and/or recipients of data messages. The identifiers 50 and 52 could also be selected/retrieved from an electronic address book stored in memory.

The user interface 40 may be locally stored and/or remotely stored. That is, the user interface 40 may be stored/maintained on the subscriber's local computer system and/or on a remote server. If the user interface 40 is stored/maintained on the subscriber's local computer system, the subscriber could locally create each data message 38. The subscriber could also locally associate each data message 38 to the originating party 44 and to the recipient party 46. Each data message 38, too, could then be locally stored/maintained on a memory subsystem at the subscriber's local computer system. The more likely scenario, however, is remote access via the Internet Protocol communications network (shown as reference numeral 34 in FIG. 1), such as a local area network, a wide are network, and/or the world wide web. That is, the subscriber logs on to a computer system (such as the communications server 22 shown in FIG. 1). The user interface 40 is accessed via a browser (perhaps as HTML pages). This remote access allows the subscriber to create each data message 38 and to remotely associate each data message 38 to the originating party 44 and to the recipient party 46. Each data message 38 is then also remotely stored/maintained on the computer system (such as the database 36 of pre-created data messages shown in FIG. 1).

Figure 4:
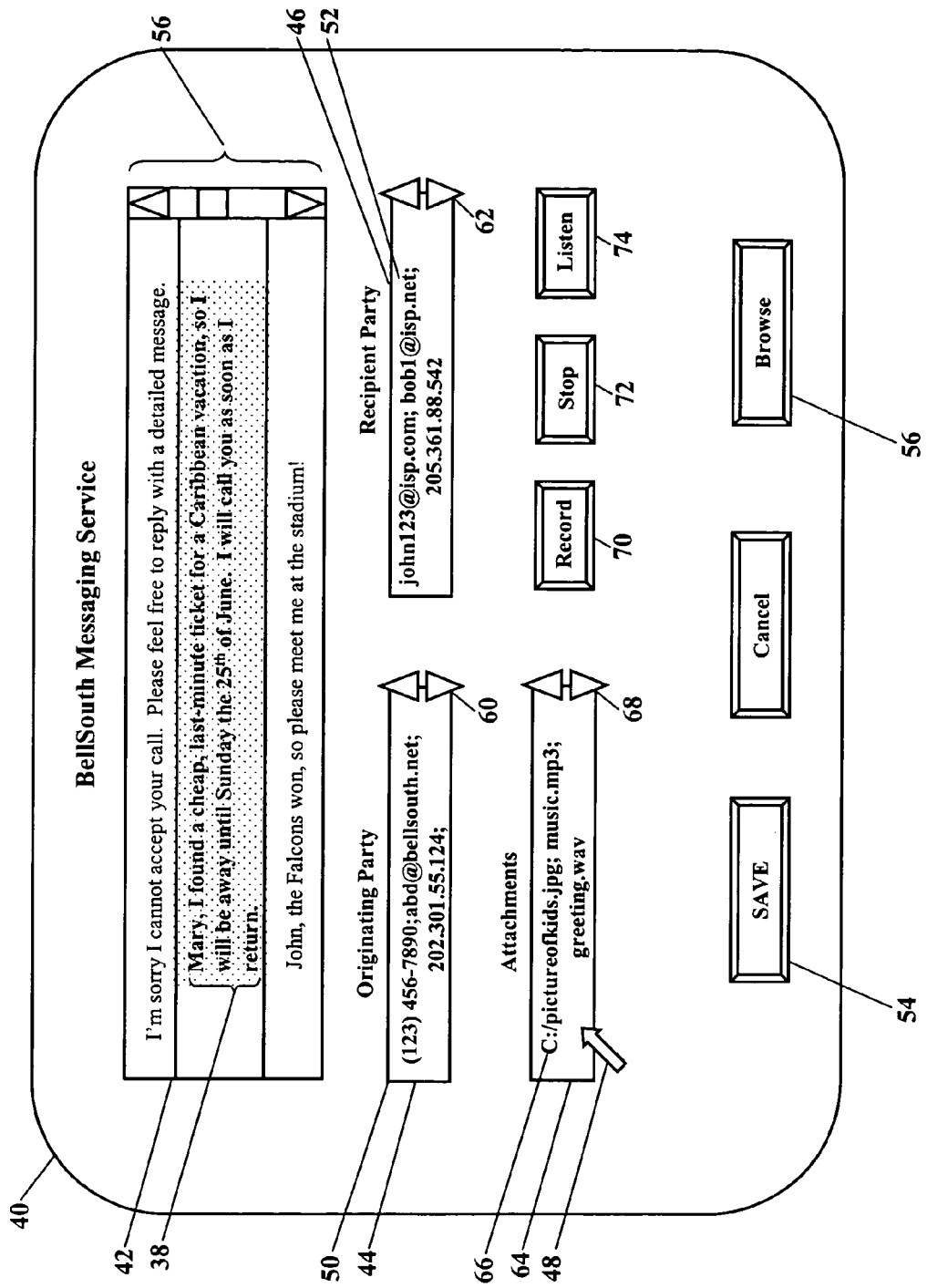

FIG. 4 is a schematic further illustrating the user interface 40, according to the embodiments of this invention. Here the user interface 40 allows the subscriber to add one or more attachments to the data message 38. The user interface 40 includes an attachment data field 64. The subscriber places the curser 48 in the attachment data field 64 and types the storage location of the desired attachment 66. The attachment data field 64 may also include scrolling icons 68. The scrolling icons 68 allow the subscriber to scroll up and down a listing of attachments 66.

The subscriber may even record audio content. FIG. 4 also shows the user interface 40 including a "Record" action button 70, a "Stop" action button 72, and a "Listen" action button 74. If the subscriber places the curser 48 on the "Record" action button 70, the subscriber may activate a digital recording device. The subscriber, for example, could speak into a microphone communicating with the computer system and/or the Communications Module (shown, respectively, as reference numerals 22 and 20 in FIG. 1). The subscriber can record a audio content and then have that audio content communicated to the recipient. The audio content is communicated as a data message (perhaps as a sound file, an attachment, packetized audio/audible data, or even a Voice Over Internet Protocol telephone call). When the subscriber finishes recording the audio content, the subscriber places the curser 48 on the "Stop" action button 72 to deactivate the digital recording device. The subscriber may even preview the audio content by placing the curser 48 on the "Listen" action button 74. When the subscriber is satisfied with the entire data message 38, including the originating party identifier(s) 50, the recipient identifier(s) 52, the attachment(s) 66, and the audio content, the subscriber saves the data message 38 using the "SAVE" icon 54. Then, when the communication from the originating party is received, the pre-created data message 38 is communicated to the recipient.

Figure 5:
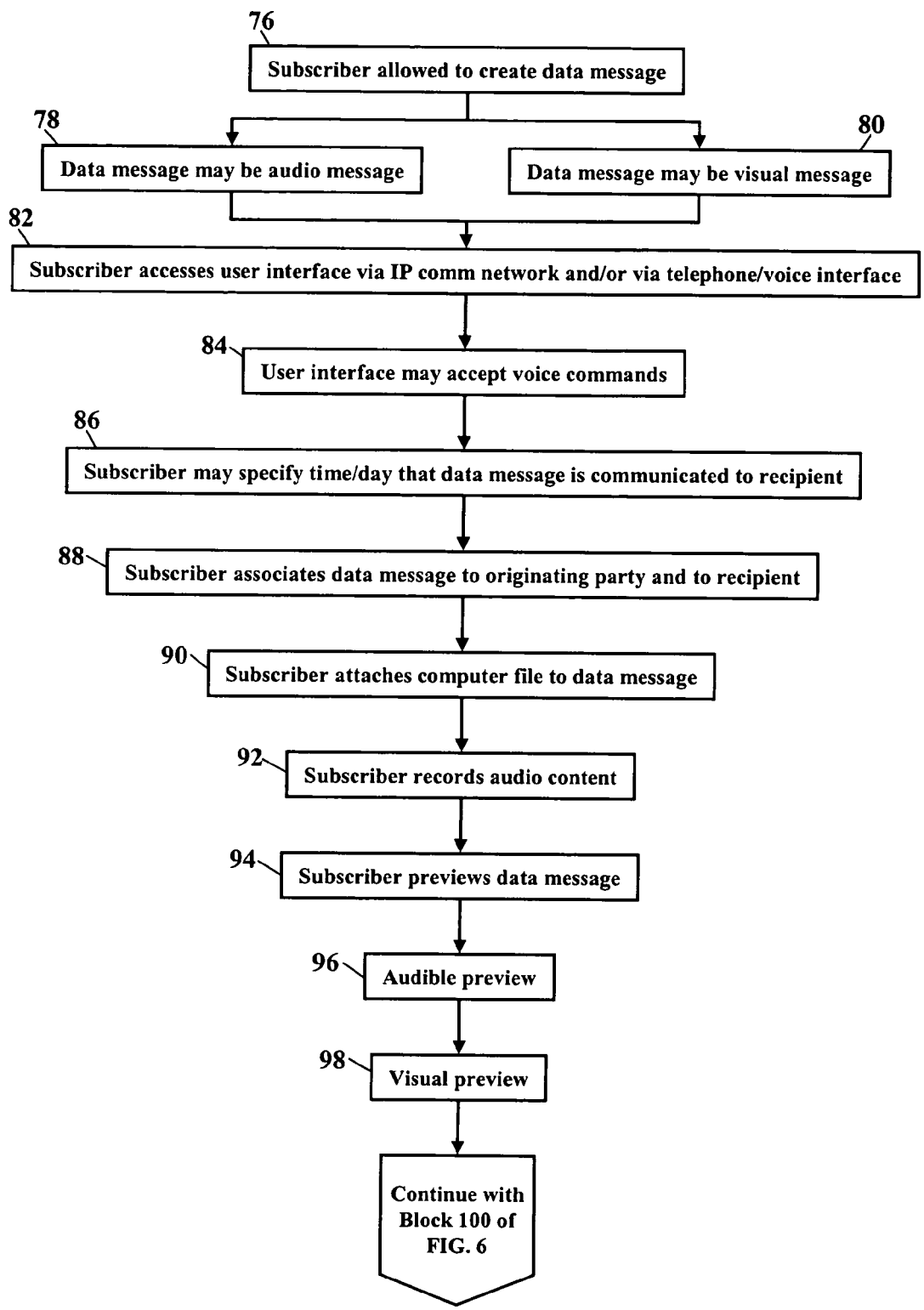
FIGS. 5 and 6 are a flowchart illustrating a method of providing communications services, according to the embodiments of this invention.
Figure 6:
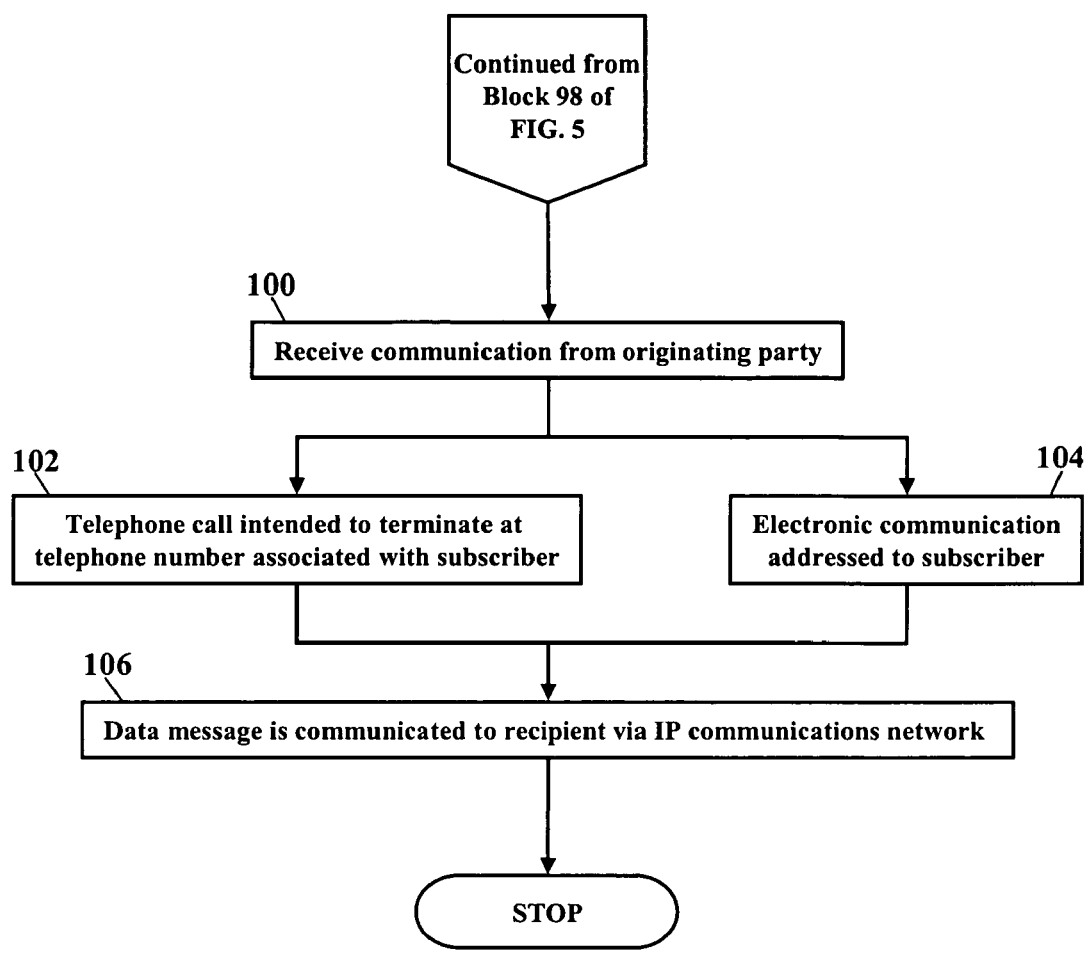

FIGS. 5 and 6 are a flowchart illustrating a method of providing communications services, according to the embodiments of this invention. A subscriber is allowed to create a data message (Block 76). The data message may be an audio message (Block 78) or a visual message (Block 80).

The subscriber may also be allowed to access a user interface via an Internet Protocol communications network and/or via a telephone/voice interface (Block 82). The user interface prompts the subscriber to create the data message and to associate the data message. The user interface may accept voice commands from the subscriber when creating the data message (Block 84). The subscriber may specify a time of day that the data message is communicated to the recipient (Block 86). The subscriber is also allowed to associate the data message to an originating party and to a recipient (Block 88). The subscriber may attach a computer file to the data message (Block 90) and/or record audio content (Block 92). The subscriber may preview the data message before communicating the data message (Block 94). The subscriber may audibly preview the data message (Block 96) and/or visually preview the data message (Block 98).

The flowchart continues with FIG. 6. A communication is received from originating party (Block 100). The communication may be a telephone call intended to terminate at a telephone number associated with the subscriber (Block 102) and/or an electronic communication addressed to the subscriber (Block 104). The data message is communicated to the recipient via an Internet Protocol communications network (Block 106).

FIG. 7 is a flowchart illustrating a method of providing communications services, according to the embodiments of this invention. A user interface is stored in memory (Block 108). The user interface allows a subscriber to compose a data message and to associate that data message with an originating party and with a recipient (Block 110). The subscriber may attach a file (Block 112), record audio content (Block 114), and preview the data message (Block 116). A communication is received from the originating party (Block 118). The communication may be a telephone call intended to terminate at a telephone number associated with the subscriber (Block 120) and/or an electronic communication addressed to the subscriber (Block 122). The data message is then communicated to the recipient (Block 124).

The Communications Module may also be physically embodied on or in any addressable (e.g., HTTP, I.E.E.E. 802.11, Wireless Application Protocol (WAP)) wireless device capable of accepting/presenting an IP address. Examples could include a computer, a wireless personal digital assistant (PDA), an Internet Protocol mobile phone, or a wireless pager.

While the present invention has been described with respect to various features, aspects, and embodiments, those skilled and unskilled in the art will recognize the invention is not so limited. Other variations, modifications, and alternative embodiments may be made without departing from the spirit and scope of the present invention.

What is claimed is:

1. A method of providing communications services, comprising:
   allowing a subscriber to select a text message from a library of pre-created text messages;
   allowing the subscriber to associate the text message to multiple originating parties and to groups of multiple recipients;
   receiving a call from an originating party; and
   communicating the text message to a group of multiple recipients via an Internet Protocol communications network.

2. A method according to claim 1, wherein receiving the communication comprises receiving a telephone call intended to terminate at a telephone number associated with the subscriber.

3. A method according to claim 1, wherein receiving the communication comprises receiving an electronic communication addressed to the subscriber.

4. A method according to claim 1, wherein allowing the subscriber to create the data message comprises allowing the subscriber to create an audio message.

5. A method according to claim 1, wherein allowing the subscriber to create the data message comprises allowing the subscriber to access a user interface via an Internet Protocol communications network, the user interface prompting the subscriber to create the data message and to associate the data message to a recipient.

6. A method according to claim 1, wherein allowing the subscriber to create the data message comprises allowing the subscriber to specify a time of day that the data message is communicated to the recipient.

7. A method according to claim 1, further comprising allowing the subscriber to preview the data message.

8. A method according to claim 7, further comprising the step of allowing the subscriber to audibly preview the data message.

9. A method according to claim 7, further comprising allowing the subscriber to visually preview the data message.

10. A method according to claim 1, further comprising allowing the subscriber to attach a computer file to the data message.

11. A method according to claim 1, wherein allowing the subscriber to create the data message comprises allowing the subscriber to record audio content.

12. A method according to claim 1, wherein allowing the subscriber to create the data message comprises allowing the subscriber to input text.

13. A method according to claim 1, further comprising accepting voice commands from the subscriber when creating the data message.

14. A method of providing communications services, comprising:
    storing a user interface in memory, the user interface allowing a first party to compose a data message and to associate that data message with a second party and with a third party;
    receiving a communication from the second party; and
    communicating the data message to the third party.

15. A method according to claim 14, wherein receiving the communication comprises receiving a telephone call intended to terminate at a telephone number associated with the first party.

16. A method according to claim 14, wherein receiving the communication comprises receiving an electronic communication addressed to the first party.

17. A method according to claim 14, further comprising allowing the first party to preview the data message.

18. A method according to claim 14, further comprising allowing the first party to attach a file to the data message.

19. A method according to claim 14, further comprising allowing the first party to record audio content for the data message.

20. A system operative to:
store a user interface in memory, the user interface allowing a first party to compose a data message and to associate that data message with a second party and with a third party;
receive a communication from the second party; and
communicate the data message to the third party.

21. A computer program product comprising processor-executable instructions for:
storing a user interface in memory, the user interface allowing a first party to compose a data message and to associate that data message with a second party and with a third party;
receiving a communication from the second party; and
communicating the data message to the third party.

* * * * *